United States Patent
Ladra et al.

(10) Patent No.: US 9,740,179 B2
(45) Date of Patent: Aug. 22, 2017

(54) PROCESSING MACHINE WITH VIBRATION COMPENSATION OF MOVABLE MECHANICAL STRUCTURES

(71) Applicant: SIEMENS AKTIENGESELLSCHAFT, München (DE)

(72) Inventors: Uwe Ladra, Erlangen (DE); Elmar Schäfers, Fürth (DE); Torsten Schür, Erlangen (DE); Dietmar Stoiber, Fürth (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 614 days.

(21) Appl. No.: 13/630,688

(22) Filed: Sep. 28, 2012

(65) Prior Publication Data

US 2013/0085607 A1 Apr. 4, 2013

(30) Foreign Application Priority Data

Sep. 30, 2011 (EP) ..................... 11183452

(51) Int. Cl.
  *G05B 13/02* (2006.01)
  *F16F 15/00* (2006.01)
  *F16F 7/10* (2006.01)

(52) U.S. Cl.
  CPC ............ *G05B 13/02* (2013.01); *F16F 7/1011* (2013.01); *F16F 15/002* (2013.01)

(58) Field of Classification Search
  USPC ......................................... 700/275
  See application file for complete search history.

(56) References Cited

U.S. PATENT DOCUMENTS 5,458,182 A * 10/1995 Aoki et al. ................. 164/154.2
5,627,440 A 5/1997 Yamamoto et al.
(Continued)

FOREIGN PATENT DOCUMENTS

CN 1833830 A 9/2006
CN 101337330 A 1/2009
(Continued)

OTHER PUBLICATIONS

Rashid et al., "Active vibration control in palletized workholding system for milling", 2005 Elsevier.*

*Primary Examiner* — Carlos Ortiz Rodriguez
(74) *Attorney, Agent, or Firm* — Henry M. Feiereisen LLC

(57) ABSTRACT

A control device of a processing machine actuates an axle drive of the processing machine commensurate with a reference displacement movement, displacing a mechanical structure of the processing machine accordingly. The control device determines an absolute movement of the mechanical structure in space and therefrom, taking into account the reference displacement movement of the mechanical structure, a compensation movement for a compensating mass damping a vibration of the mechanical structure. Arranged on the mechanical structure is a compensating drive which acts on the compensating mass. The control device actuates the compensating drive in accordance with the compensation movement, displacing the compensating mass relative to the mechanical structure and thereby damping the vibration of the mechanical structure.

12 Claims, 2 Drawing Sheets

(56) References Cited

U.S. PATENT DOCUMENTS

| | | |
|---|---|---|
| 5,850,112 A | 12/1998 | Sienz et al. |
| 6,065,338 A | 5/2000 | Stoiber et al. |
| 6,118,245 A | 9/2000 | Sienz et al. |
| 6,566,771 B1 | 5/2003 | Stoiber |
| 6,690,133 B2 | 2/2004 | Knorr et al. |
| 6,744,155 B1 | 6/2004 | Stoiber |
| 6,825,633 B2 | 11/2004 | Ladra et al. |
| 6,979,932 B2 | 12/2005 | Ladra et al. |
| 7,078,842 B2 | 7/2006 | Hoppe et al. |
| 7,152,503 B2 | 12/2006 | Ladra et al. |
| 7,156,555 B2 | 1/2007 | Ladra et al. |
| 7,208,901 B2 | 4/2007 | Ladra et al. |
| 7,424,337 B2 | 9/2008 | Schafers et al. |
| 7,654,746 B2 | 2/2010 | Ladra et al. |
| 7,800,334 B2 | 9/2010 | Ladra et al. |
| 7,818,087 B2 | 10/2010 | Ladra et al. |
| 7,950,639 B2 | 5/2011 | Ladra et al. |
| 8,040,017 B2 | 10/2011 | Ladra et al. |
| 8,063,598 B2 | 11/2011 | Stoiber et al. |
| 8,157,252 B2 | 4/2012 | Ladra et al. |
| 8,294,314 B2 | 10/2012 | Denk et al. |
| 2003/0090645 A1 | 5/2003 | Kato |
| 2006/0238061 A1 | 10/2006 | Hoppe et al. |
| 2008/0257667 A1 | 10/2008 | Ladra et al. |
| 2009/0050782 A1 | 2/2009 | Forster et al. |
| 2009/0174270 A1 | 7/2009 | Denk et al. |
| 2009/0278019 A1 | 11/2009 | Ladra et al. |
| 2009/0302699 A1 | 12/2009 | Denk et al. |
| 2009/0315505 A1 | 12/2009 | Denk et al. |
| 2010/0092262 A1 | 4/2010 | Hamann et al. |
| 2010/0178123 A1 | 7/2010 | Ladra et al. |

FOREIGN PATENT DOCUMENTS

| | | |
|---|---|---|
| EP | 0685779 A1 | 12/1995 |
| EP | 0685799 A1 | 12/1995 |
| EP | 1803967 A2 | 7/2007 |
| JP | H04326102 A | 11/1992 |
| JP | 2002061703 A | 2/2002 |

* cited by examiner

PROCESSING MACHINE WITH VIBRATION COMPENSATION OF MOVABLE MECHANICAL STRUCTURES

CROSS-REFERENCES TO RELATED APPLICATIONS

This application claims the priority of European Patent Application, Serial No. 11183452.9, filed Sep. 30, 2011, pursuant to 35 U.S.C. 119(a)-(d), the content of which is incorporated herein by reference in its entirety as if fully set forth herein.

BACKGROUND OF THE INVENTION

The present invention relates to a method for operating a processing machine, a control program for operating a processing machine, a control device for a processing machine, and a processing machine, all of which provide vibration compensation.

The following discussion of related art is provided to assist the reader in understanding the advantages of the invention, and is not to be construed as an admission that this related art is prior art to this invention.

Vibrations are a common occurrence during processing operations performed by machine tools, industrial robots, etc. Vibrations lead to processing inaccuracies. In many cases the processing inaccuracies can be tolerated. In other cases the processing inaccuracies cannot be tolerated. In particular the vibrations can in some cases even lead to such an extreme that the processing machine starts to chatter. In a situation of the kind operation must proceed for example at a lower feed rate, as a result of which productivity is reduced.

The forms of vibrations occurring can be different in nature depending on processing machine. In the case of a cantilever arm, for example, a typical flexural vibration ("trunk movement") is a frequent occurrence. Linear or torsional vibrations are also possible.

The possibilities for damping vibrations are limited in the prior art. In traditional mechanical engineering, for example, passive vibration absorbers are used. Passive vibration absorbers are auxiliary masses which are resiliently mounted on the displaceable mechanical structure and tuned to the frequency that need to be damped.

It is also known in the prior art to employ active vibration dampers for damping vibrations of mechanical structures. With active vibration dampers, an absolute movement of the mechanical structure in space is determined by means of a corresponding system of sensors. The absolute movement is analyzed in order to determine a compensation movement for a compensating mass which damps the vibration of the mechanical structure. A compensating drive arranged on the mechanical structure and acting on the compensating mass is actuated in accordance with the determined compensation movement such that the compensating mass is displaced relative to the mechanical structure by means of the compensating drive in accordance with the compensation movement.

The approach typically adopted in the case of active vibration dampers cannot be applied without careful consideration in the case of mechanical structures which are displaced more or less continuously. In particular, the active vibration damper would counteract the desired reference displacement movement and therefore make the movement more difficult.

It would therefore be desirable and advantageous to obviate prior art shortcomings and to provide an improved approach for damping vibrations of displaceable mechanical structures with an active vibration damper.

SUMMARY OF THE INVENTION

According to one aspect of the present invention, a method for operating a processing machine includes the steps of controlling an axle drive of the processing machine with a control device of the processing machine commensurate with a reference displacement movement so as to displace a mechanical structure of the processing machine with the axle drive commensurate with the reference displacement movement, determining with the control device an absolute movement of the mechanical structure in space, determining with the control device a compensation movement for a compensating mass based on the determined absolute movement, taking into account the reference displacement movement of the mechanical structure, so as to dampen a vibration of the mechanical structure, and controlling, with the control device, a compensating drive arranged on the mechanical structure and acting on the compensating mass commensurate with the determined compensation movement such that the compensating mass is displaced relative to the mechanical structure by the compensating drive commensurate with the compensation movement.

By taking the reference displacement movement into consideration when determining the compensation movement, the compensation movement advantageously does not impede the normal operationally correct displacement of the mechanical structure, but solely brings about the damping of undesirable vibrations.

According to an advantageous feature of the present invention, the compensation movement may be determined by the control device base on the difference between an actual acceleration of the mechanical structure in space and a reference acceleration corresponding to the reference displacement movement of the mechanical structure. This embodiment enables the reference displacement movement to be taken into account in a particularly simple manner.

According to another advantageous feature of the present invention, in order to obtain the actual acceleration of the mechanical structure in space, the control device may receive a signal that is characteristic of the actual acceleration of the mechanical structure in space. With this approach, the actual acceleration is available directly and immediately.

According to another advantageous feature of the present invention, the actual acceleration of the mechanical structure in space may be determined with the control device based on measured values that are different from the actual acceleration of the mechanical structure in space. With this embodiment, an acceleration sensor is not required. The measured values used here may include in particular actual values of the compensating drive and/or a position of the compensating mass relative to the mechanical structure and/or at least one derivative with respect to time of the position of the compensating mass relative to the mechanical structure. For example, the measured values may include, on the one hand, the actual current or the actual torque of the compensating drive and, on the other hand, the first derivative with respect to time of the position of the compensating mass relative to the mechanical structure.

According to yet another advantageous feature of the present invention, in addition to the compensation movement, the compensating mass may be displaced with the control device through corresponding actuation of the compensating drive through a superimposed movement relative to the mechanical structure. This approach reliably minimizes nonlinear friction effects incorporated as interference factors during the acquisition of the measured values. Advantageously, the superimposed movement is defined in such a way that at any instant in time the first, the second and/or the third derivative with respect to time of the superimposed movement are/is nonzero.

The superimposed movement is generally an oscillating movement. Its excursion can be set as required. Its frequency is usually relatively low.

According to another aspect of the invention, a control device for a processing machine is configured to operate the processing machine according to the aforedescribed method. According to yet another aspect of the invention, a control program embodied in a non-transitory machine-readable medium and including machine code which when loaded into a memory of a control device for a processing machine is directly executable by the control device, wherein execution of the machine code by the control device causes the control device to carry out the aforedescribed method.

According to yet another aspect of the invention, a processing machine includes a mechanical structure, an axle drive configured to displace the mechanical structure commensurate with a reference displacement movement, a control device controlling the processing machine commensurate with the reference displacement movement, and a compensating drive arranged on the mechanical structure and operating on a compensating mass so as to displace the compensating mass relative to the mechanical structure. The control device is once more configured to carry out the aforedescribed method.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
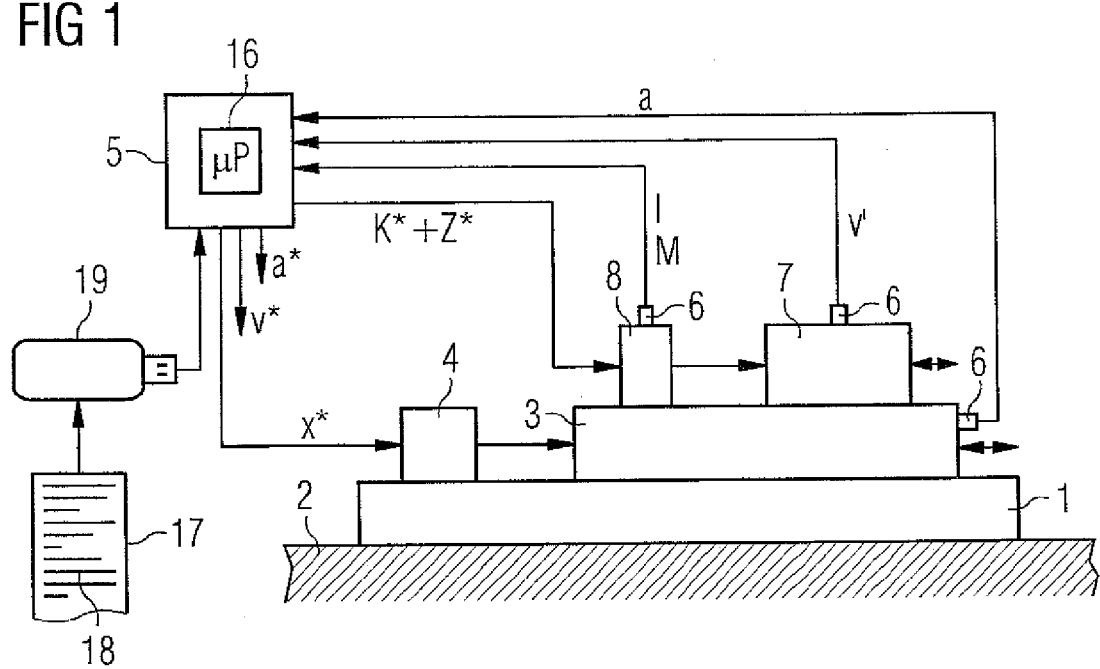
FIG. 1 shows a processing machine with vibration compensation according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a processing machine—a machine tool or an industrial robot for example—having a base body 1. The base body is generally arranged in a permanently stationary manner on a foundation 2.

The processing machine additionally has (at least) one mechanical structure 3. The mechanical structure 3 is displaceable by means of an axle drive 4 of the processing machine in accordance with a reference displacement movement. The axle drive 4 can for example be actuated by a control device 5 of the processing machine in a machine cycle in each case in accordance with a position reference value x* (or another reference value v*, a*, for example a velocity reference value v* or an acceleration reference value a*). The machine cycle usually lies in the low millisecond range or below. A machine cycle of 2 ms, 1 ms, 500 µs, 250 µs, 125 µs or 62.5 µs is typical.

The axle drive 4 displaces the mechanical structure 3 in accordance with the predefined reference displacement movement. Furthermore, vibrations can be excited in the mechanical structure 3—whether by means of external influences, whether by means of the method per se, or whether due to other factors. Sensors 6 are present in order to enable vibrations of the type to be detected. Signals that are characteristic of the absolute movement of the mechanical structure 3 in space are measured by means of the sensors 6 based on measurement techniques. The signals captured by the sensors 6 are supplied to the control device 5 which from them determines the absolute movement of the mechanical structure 3 in space.

In order to damp the vibrations of the mechanical structure 3, the processing machine additionally has a compensating mass 7 and a compensating drive 8. The compensating drive 8 is arranged on the mechanical structure 3. It acts on the compensating mass 7. The compensating drive 8 can alternatively be embodied as a rotary electric machine or as an electric linear drive, the latter embodiment being preferred in many cases.

The compensating mass 7 can be displaced relative to the mechanical structure by means of the compensating drive 8. The control device 5 therefore determines based on the previously determined absolute movement of the mechanical structure 3 in space, taking into account the reference displacement movement of the mechanical structure 3, a compensation movement K* in accordance with which the compensating mass 7 is to be moved. The control device 5 determines the compensation movement K* in such a way that a vibration of the mechanical structure 3 that has occurred is damped. The control device 5 also actuates the compensating drive 8 in accordance with the determined compensation movement K*. As a result the compensating mass 7 is displaced relative to the mechanical structure 3 by means of the compensating drive 8 in accordance with the compensation movement K*, thereby damping the vibration.

Insofar as the displacement direction defined by the compensation movement K* is concerned, however, the compensating mass 7 is not supported on the mechanical structure 3. This can be realized in that the compensating mass 7 travels along in piggyback fashion, as it were, on the compensating drive 8. Alternatively the compensating mass 7 can in fact be guided relative to the mechanical structure 3 orthogonally with respect to the displacement direction, for example by way of guide rails. Even in this case, however, there is no direct transmission of energy from the compensating mass 7 to the mechanical structure 3, i.e. while bypassing the compensating drive 8.

Figure 2:
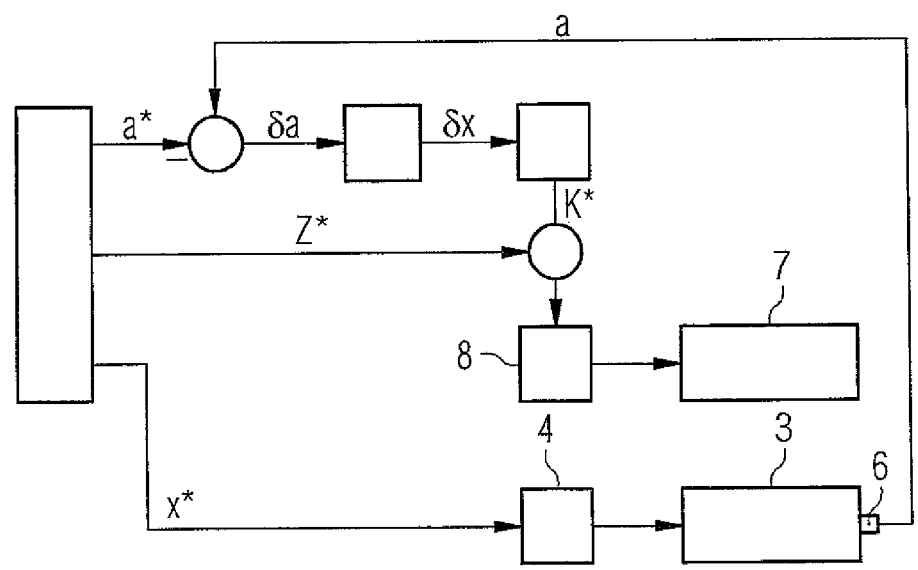
FIG. 2 shows a closed-loop control diagram for a compensating drive according to an embodiment of the present invention.

Determining the compensation movement K* for a static mechanical structure 3 is a technique generally known to persons skilled in the art. In general—see FIG. 2—a resulting actual position dx of the mechanical structure 3 is estimated based on a resulting acceleration da. The compensation movement K* is then determined using this estimation as a basis.

Figure 3:
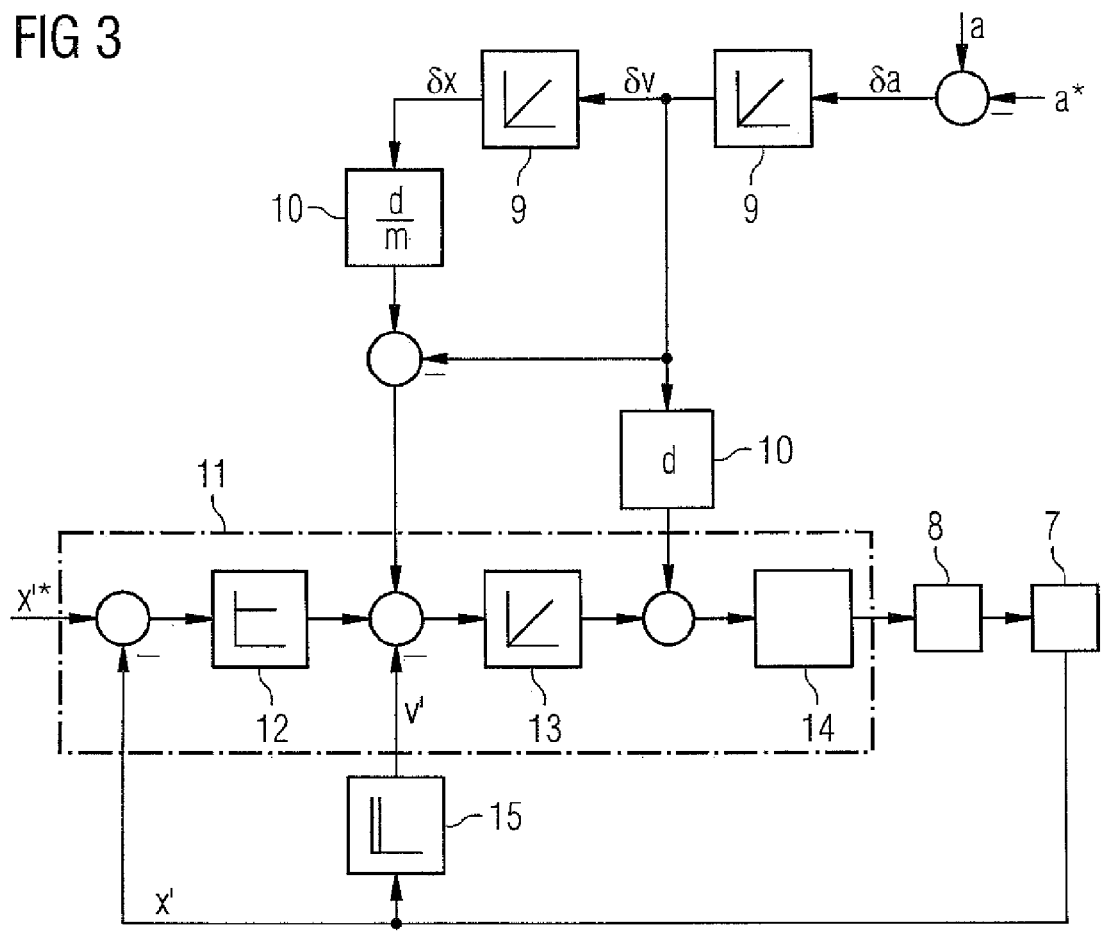
FIG. 3 shows an internal layout of the closed-loop control diagram of FIG. 2.

It is possible for example—see FIG. 3—by twofold integration in integrators 9 to determine, based on the resulting acceleration da, firstly a resulting velocity dv and then the resulting actual position dx of the mechanical structure 3.

The resulting velocity dv and the resulting position dx can be scaled in scaling elements 10 using suitable scaling factors, where d in the scaling elements 10 stands for a desired damping, and m stands for the mass (in kg) of the compensating mass 7.

According to FIG. 3, the correspondingly scaled values can be applied to a closed-loop controller structure 11 which adjusts the position x' and the velocity v' of the compensating mass 7 relative to the mechanical structure 3. Internally, the controller structure 11 has a position controller 12, a velocity controller 13 and possibly a current controller 14. The closed-loop controller structure 11 acts on the compensating drive 8. The position x' of the compensating mass 7 relative to the mechanical structure 3 and the corresponding velocity v' are supplied as actual values x', v' to the closed-loop controller structure 11. The velocity v' can be determined for example in a derivative element 15 by differentiation of the position x'. A reference position x'* is supplied as reference value x'* to the closed-loop controller structure 11. The reference position x'* can be constant or time-value.

It is possible to subject the resulting acceleration da or the value derived from the resulting acceleration da to frequency filtering. Frequency filtering of the type is generally known to persons skilled in the art and so is not depicted in the schematic shown in FIG. 3.

The compensation movement K* can also still be determined for the processing machine according to the invention based on the resulting acceleration da. According to the diagrams shown in FIGS. 2 and 3, it is, however, necessary, in order to determine the resulting acceleration da, to subtract the reference acceleration a* from an actual acceleration a of the mechanical structure 3, in other words to form the difference between the actual acceleration a of the mechanical structure 3 and the reference acceleration a* of the mechanical structure 3. The reference acceleration a* corresponds to the reference displacement movement. It can be given directly and immediately by the reference displacement movement or be determined by the control device 5 based on the reference displacement movement.

Various approaches are possible with regard to the actual acceleration a of the mechanical structure 3. On one hand, it is possible according to FIG. 1 for one of the sensors 6 to be arranged on the mechanical structure 3 itself and to be embodied as an acceleration sensor. In this case the sensor 6 can measure the actual acceleration a directly and immediately and supply it to the control device 5.

On the other hand, the measured values v', I, M measured by the sensors 6 may be measured values v', I, M that are different from the actual acceleration a of the mechanical structure 3. In this case, the actual acceleration a is determined by the control device 5 based on the actually measured values v', I, M.

Figure 4:
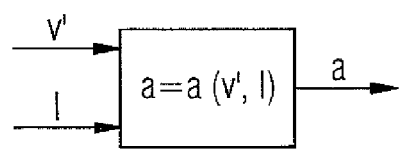
FIG. 4 shows an exemplary setup for determining acceleration.

For example, suitable actual values I, M of the compensating drive 8 and/or the position x' of the compensating mass 7 relative to the mechanical structure 3 and/or a derivative with respect to time v' of the position x'—in particular the first derivative with respect to time v', i.e. the velocity v'—can be supplied for this purpose to the control device 5 by means of the sensors 6. The actual values I, M of the compensating drive 8 can include in particular the actual current I or the actual torque M of the compensating drive 8. According to FIG. 4, the control device 5 can for example determine the actual acceleration a of the mechanical structure 3 based on the actual torque M or the actual current I of the compensating drive 8 and the velocity v' of the compensating mass 7 relative to the mechanical structure 3. Further values are not required for determining the actual acceleration a.

The control device 5 may actuate the compensating drive 8 exclusively in accordance with the compensation movement K*. Alternatively, as shown in FIG. 1, the compensating mass 7 may be additionally displaced by the control device 5 with a superimposed movement Z* relative to the mechanical structure 3 through corresponding control of the compensating drive 8. For example, the position reference value x'*—see FIG. 3—can be modulated accordingly for this purpose. The superimposed movement Z* is preferably defined such that at any instant in time—with reference to the superimposed movement Z*—at least one of the following values is different from 0:

The first derivative with respect to time, i.e. the velocity component caused by the superimposed movement Z*, of the movement of the compensating mass 7 relative to the mechanical structure 3, the second derivative with respect to time, i.e. the acceleration component caused by the superimposed movement Z*, of the movement of the compensating mass 7 relative to the mechanical structure 3, and the third derivative with respect to time, i.e. the jerk component caused by the superimposed movement Z*, of the movement of the compensating mass 7 relative to the mechanical structure 3.

The superimposed movement Z* is usually an oscillating movement. Its frequency must lie outside the resonance spectrum of the mechanical structure 3, i.e. it must have a sufficiently low frequency, for example.

According to the schematic shown in FIG. 1, a microprocessor 16 is normally included internally in the control device 5. Typically, therefore, the control device 5 is embodied as a software-programmable control device which executes the computer program 17. The computer program 17 comprises machine code 18 which is directly executable by the control device 5 (more precisely: by the microprocessor 16 of the control device 5). The processing of the machine code 18 causes the control device 5 to operate the processing machine in accordance with the aforedescribed inventive operating method explained.

The computer program 17 can be supplied to the control device 5 in any desired fashion. For example, the computer program 17 can be stored in machine-readable form—in particular in electronic form—on a data medium 19, and supplied to the control device 5 by way of the data medium 19. Purely by way of example, the data medium 19 according to FIG. 1 is embodied as a USB memory stick. However, this embodiment can be varied without problem.

It is easily possible by means of the embodiments according to the invention to damp vibrations of displaceable mechanical structures 3.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating a processing machine, comprising the steps of:
controlling an axle drive of the processing machine with a control device of the processing machine commensurate with a reference displacement movement so as to displace a mechanical structure of the processing machine with the axle drive relative to a stationary base commensurate with the reference displacement movement,
determining, with the control device, an absolute movement of the mechanical structure with respect to the stationary base,
determining, with the control device, a compensation movement for a physical compensating mass that is connected for force transmission to a compensating drive arranged on the mechanical structure and movable by way of the compensating drive relative to the mechanical structure, based on the determined absolute movement, taking into account the reference displacement movement of the mechanical structure, so as to dampen a vibration of the mechanical structure, and
controlling, with the control device the compensating drive so as to act on the compensating mass commensurate with the determined compensation movement such that the compensating mass is displaced relative to the mechanical structure by the compensating drive commensurate with the compensation movement.

2. The method of claim 1, wherein the compensation movement is determined with the control device based on a difference between an actual acceleration of the mechanical structure with respect to the stationary base and a reference acceleration corresponding to a reference displacement movement of the mechanical structure.

3. The method of claim 2, wherein the control device receives a signal that is characteristic of the actual acceleration of the mechanical structure with respect to the stationary base.

4. The method of claim 2, wherein the actual acceleration of the mechanical structure with respect to the stationary base is determined with the control device based on measured values that are different from the actual acceleration of the mechanical structure with respect to the stationary base.

5. The method of claim 4, wherein the measured values comprise at least one value selected from an actual value of the compensating drive, a position of the compensating mass relative to the mechanical structure, and at least one derivative with respect to time of the position of the compensating mass relative to the mechanical structure.

6. The method of claim 4, wherein the measured values comprise an actual current or an actual torque of the compensating drive and a first derivative with respect to time of the position of the compensating mass relative to the mechanical structure.

7. The method of claim 4, wherein the measured values consist of at least one value selected from an actual value of the compensating drive, a position of the compensating mass relative to the mechanical structure, and at least one derivative with respect to time of the position of the compensating mass relative to the mechanical structure.

8. The method of claim 4, wherein the measured values consist of an actual current or an actual torque of the compensating drive and a first derivative with respect to time of the position of the compensating mass relative to the mechanical structure.

9. The method of claim 1, wherein—in addition to the compensation movement—the compensating mass is displaced with the control device by superimposing a movement relative to the mechanical structure through actuation of the compensating drive, wherein at least one of a first, a second and a third derivative with respect to time of the superimposed movement is different from zero at any time.

10. A non-transitory machine-readable medium comprising a control program having machine code which when loaded into a memory of a control device for a processing machine is directly executable by the control device, wherein execution of the machine code by the control device causes the control device to
control an axle drive of the processing machine commensurate with a reference displacement movement so as to displace a mechanical structure of the processing machine with the axle drive relative to a stationary base commensurate with the reference displacement movement,
determine an absolute movement of the mechanical structure with respect to the stationary base,
determine a compensation movement for a physical compensating mass that is connected for force transmission to a compensating drive arranged on the mechanical structure and movable by way of the compensating drive relative to the mechanical structure, based on the determined absolute movement, taking into account the reference displacement movement of the mechanical structure, so as to dampen a vibration of the mechanical structure, and
control the compensating drive so as to act on the compensating mass commensurate with the determined compensation movement such that the compensating mass is displaced relative to the mechanical structure by the compensating drive commensurate with the compensation movement.

11. A control device for a processing machine, wherein the control device is configured to operate the processing machine by:
controlling an axle drive of the processing machine commensurate with a reference displacement movement so as to displace a mechanical structure of the processing machine with the axle drive relative to a stationary base commensurate with the reference displacement movement,
determining an absolute movement of the mechanical structure with respect to the stationary base,
determining a compensation movement for a physical compensating mass that is connected for force transmission to a compensating drive arranged on the mechanical structure and movable by way of the compensating drive relative to the mechanical structure, based on the determined absolute movement, taking into account the reference displacement movement of the mechanical structure, so as to dampen a vibration of the mechanical structure, and
controlling the compensating drive so as to act on the compensating mass commensurate with the determined compensation movement such that the compensating mass is displaced relative to the mechanical structure by the compensating drive commensurate with the compensation movement.

12. A processing machine, comprising:
a stationary base,
a mechanical structure movable with respect to the stationary base,
an axle drive configured to displace the mechanical structure relative to the stationary base commensurate with a reference displacement movement,
a control device controlling the axle drive commensurate with the reference displacement movement,
a compensating drive, which is different from the axle drive, affixed on the mechanical structure, and
a physical compensating mass that is connected for force transmission to the compensating drive and movable by way of the compensating drive relative to the mechanical structure so as to displace the compensating mass relative to the mechanical structure,
wherein the control device is configured to
determine an absolute movement of the mechanical structure relative to the stationary base,
determine a compensation movement for the physical compensating mass based on the determined absolute movement, taking into account the reference displacement movement of the mechanical structure, so as to dampen a vibration of the mechanical structure, and
control the compensating drive so as to act on the compensating mass commensurate with the determined compensation movement such that the compensating mass is displaced relative to the mechanical structure by the compensating drive commensurate with the compensation movement.

* * * * *